April 27, 1926. 1,582,680

R. C. GRUBB

DRILL

Filed April 6, 1925

INVENTOR
ROBERT C. GRUBB
by White Prost Travers
his ATTORNEYS

Patented Apr. 27, 1926.

1,582,680

UNITED STATES PATENT OFFICE.

ROBERT C. GRUBB, OF SAN FRANCISCO, CALIFORNIA.

DRILL.

Application filed April 6, 1925. Serial No. 21,062.

*To all whom it may concern:*

Be it known that I, ROBERT C. GRUBB, a citizen of the United States, and a resident of the city and county of San Francisco, State of California, have invented a new and useful Drill, of which the following is a specification.

My invention relates to drills and particularly to drills or attachments thereto which are adapted to make and countersink holes in brake linings, especially brake linings in automobile brake bands.

An object of the invention is to provide a device which will facilitate drilling and countersinking holes.

Another object of my invention is to provide a device which may be attached to a drill press or other suitable machine and which will expedite the drilling of holes such as those in linings used with brake bands.

The invention possesses other advantageous features, some of which, with the foregoing, will be set forth at length in the following description where I shall outline in full that form of the drill which I have selected for illustration in the drawings accompanying and forming part of the present specification.

Broadly speaking, my invention preferably comprises a frame generally having attaching means thereon, such as an adjustable attaching clamp, for mounting the device on a suitable support, a vertical driving shaft projecting above the frame for convenient connection with a suitable driving means, a spindle connected preferably by housed gears to the driving shaft and adapted at its upper end to drive a drilling tool, an adjustable limit stop adjacent the drilling tool, and a centering pin preferably slidably mounted in the frame in axial alignment with the drilling tool.

My invention is conveniently used in the process of lining automobile brake bands, and it is in that connection that I shall describe it.

Automobile brake bands usually consist of the brake band proper 6, which is a flexible strip of metal, and a fabric lining 7 having a high coefficient of friction. Such lining is generally affixed to the flexible band by rivets. The rivets are placed in holes 8 drilled through the lining and band so that their heads are countersunk below the lining surface and the riveted portion lies on the outside of the band, away from the lining. Suitable brake lining is furnished by the manufacturer in long strips, from which a portion must be cut to length and drilled to fit the band for which it is intended. One of the functions of my device is to drill holes in the brake lining in proper registry with the holes which are in the metallic brake band.

Figure 1:
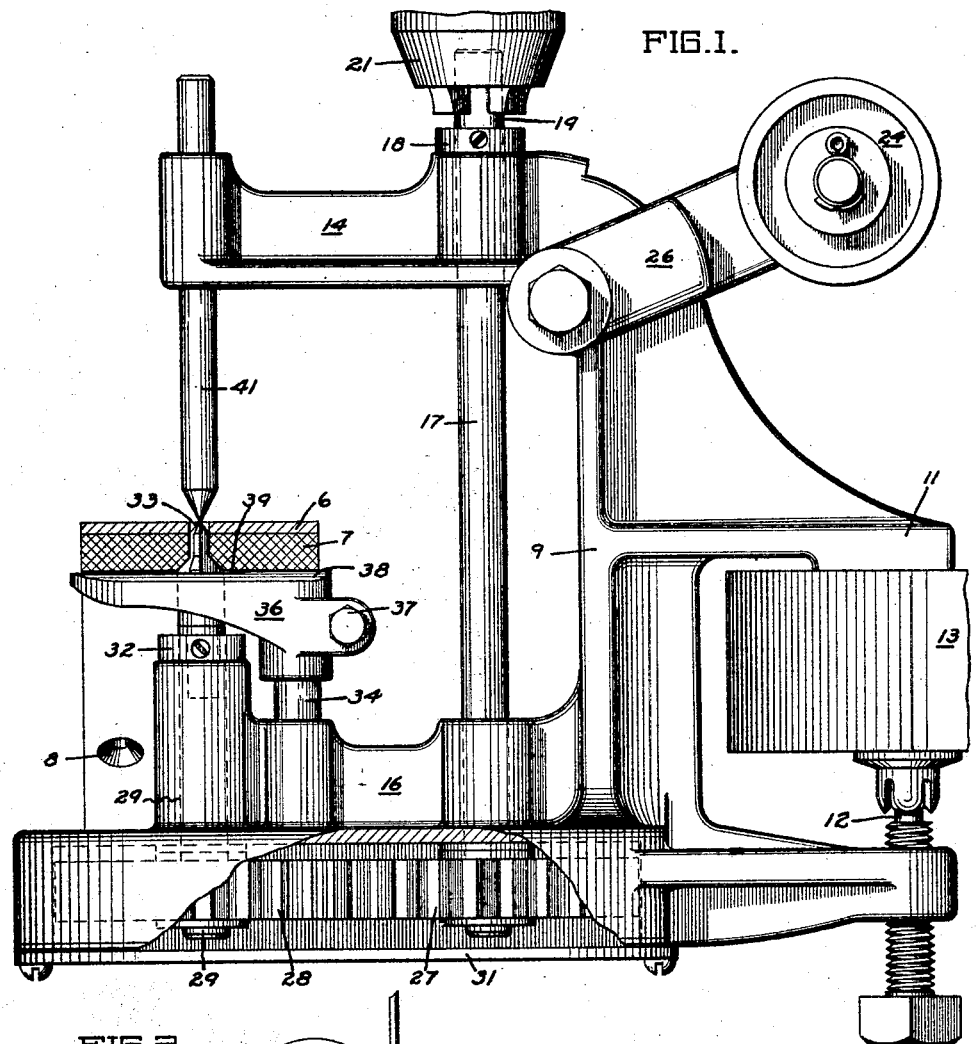
Figure 1 is a side elevation of the drill of my invention, a portion being broken away to show the gears; a cross section of a brake band being drilled being shown in position on the limit stop.
Figure 2:
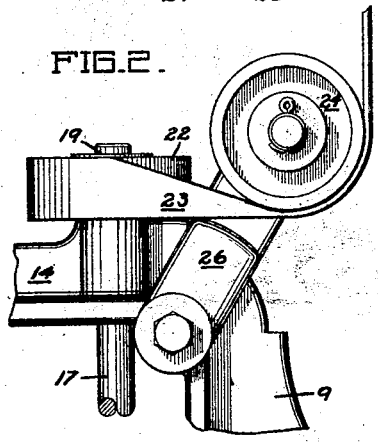
Fig. 2 shows the idler arm and idlers in position for belt drive from above the pulley.
Figure 3:
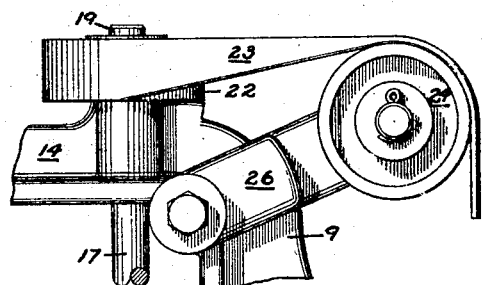
Fig. 3 shows the idler arm and idlers in position for belt drive from below the pulley.

In its preferred form, my invention comprises a frame 9, made of cast iron or similar material and having an attaching clamp 11, fitted with an adjusting or clamping screw 12, by means of which it may be fastened to a support 13, such as a work bench or the table of a drill press. The frame has a horizontal arm 14 extending from above the bracket, and a horizontal housing 16 extending from below the bracket. A vertical driving shaft 17 is journaled in the arm and in the housing. The shaft is held in position by any convenient means such as a collar 18 and is allowed to extend above the top of the frame to provide a place to which driving means may be attached. The extended part 19 of the driving shaft may be gripped in the chuck of a drill press 21 as shown in Fig. 1, or may have a pulley 22 attached to it as shown in Figs. 2 and 3, and be driven by a belt 23; idlers 24 on an adjustable idler arm 26 mounted on the frame, serving as belt guides, whether the belt comes from above the pulley as in Fig. 2, or from below the pulley as in Fig. 3.

The bottom end of the driving shaft carries a gear 27 which meshes with a gear 28 on the bottom of a spindle 29. The gears are completely enclosed in the housing, are protected from grit and dirt, and may run in a bath of oil to insure their quiet operation and long life. The cover plate 31 at the bottom of the housing may be removed for inspection of the gears or to introduce lubricant to them.

The spindle is journaled in the top of the gear housing and lies substantially parallel with the driving shaft. If the spindle is journaled at an angle to the driving shaft, bevel gears must be used in place of the spur gears which are used when the shaft and spindle are parallel. The spindle is kept from vertical displacement by proper means, such as a collar 32. At the upper end of the spindle, suitable drilling means 33 are mounted. These means may be a tool of any fitting sort, which for the operation being described, is usually a countersink, as shown in the drawings.

At one side of the spindle, a stub shaft 34 projects from a boss on the top of the housing. A limit stop 36 is arranged to slide vertically on the stub shaft and may be clamped tightly in adjusted position on the shaft by means of a bolt and nut 37. The limit stop has a horizontal arm projecting from the portion bearing on the stub shaft. The upper surface 38 of the horizontal arm is arcuate to conform to the curvature of the lining to be drilled and the arcuate surface has a slot 39 extending through the greater part of its length so that it can be positioned below the point of the countersink and can surround the countersink on several sides.

A centering pin 41 is mounted in the upper arm of the frame in axial alignment with the drilling tool. The centering pin is free to slide up and down in its mounting and normally its lower end, which is pointed, rests on the point of the drilling tool.

To use my device in relining brake bands, it is attached by means of the attaching clamp to a drill press table and the projecting end of the driving shaft fitted into the chuck of the drill press. Rotation of the chuck rotates the countersink by means of the driving shaft, gears, and spindle. The limit stop is adjusted to a height depending upon the thickness of the brake lining to be drilled and the depth of chamfer desired. The brake band, with the lining held in position on its under side, is centered over the countersink by placing it with the centering pin in the hole in the metallic brake band. The lining and band are then forced downward over the rotating countersink until they come into contact with the arcuate top surface of the limit stop. The centering pin aids in guiding them down until its point rests on the point of the drilling tool. After they have been forced downward as far as the limit stop will permit them to go, the band and lining are raised from the countersink and removed from the machine. It will be found that a countersunk hole has been drilled in the lining in perfect registry with the hole already in the brake band. The process is repeated for each hole it is desired to place in the brake lining.

The device of my invention is especially adapted to be attached to drill presses or similar machines which are found in almost all garages and machine shops, and it is especially suited to serve in the relining of automobile brake bands. It is to be understood, however, that it may alternatively be driven by belts, an example of which is shown in Figs. 2 and 3, or by other suitable means, such as by a directly connected electric motor, and it may also be used in a multiplicity of operations other than that of relining automobile brake bands.

I claim:

1. An attachment for a drill press comprising a frame, a drill spindle journalled in said frame, drilling means on the upper end of said spindle, a drive shaft journalled vertically in said frame and spaced transversely from said drill spindle, the upper end of the drive shaft extending above the frame to engage the chuck of said drill press, and means connecting the lower ends of the spindle and shaft.

2. An attachment for a drill press comprising a frame, a spindle journalled vertically in said frame and provided at its upper end with drilling means, a vertical driving shaft journalled in said frame and spaced transversely from the spindle, the upper end of the drive shaft extending above the frame for engagement with the chuck of said drill press and means on said frame for securing the frame to the table of said drill press.

3. An attachment for a drill press comprising a frame, a housing forming part of said frame, a spindle journalled vertically in said frame and provided at its upper end with drilling means, a vertical driving shaft journalled in and extending above said frame to be received in the chuck of said drill press, said spindle and drive shaft extending into said housing, and gears in said housing connecting said shaft to said spindle.

4. An attachment for a drill press comprising a frame having a chamber at the bottom thereof, a vertical drive shaft journalled adjacent its upper end and adjacent its lower end in said frame, a spindle journalled in said frame parallel to said drive shaft, a drill on the upper end of said spindle, a gear on the lower end of said spindle and disposed in said chamber, a gear on the lower end of said drive shaft disposed in said chamber and meshing with said first named gear, and a cover for said chamber, the upper end of said drive shaft extending above said frame for engagement with the chuck of said drill press.

In testimony whereof, I have hereunto set my hand.

ROBERT C. GRUBB.